(12) United States Patent
Wang et al.

(10) Patent No.: US 11,153,884 B2
(45) Date of Patent: Oct. 19, 2021

(54) METHOD AND DEVICES FOR TRANSMITTING SYSTEM INFORMATION FROM TERMINAL DEVICE

(71) Applicant: Huawei Technologies Co., Ltd., Shenzhen (CN)

(72) Inventors: Jing Wang, Beijing (CN); Bo Lin, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/455,341

(22) Filed: Jun. 27, 2019

(65) Prior Publication Data

US 2019/0320443 A1    Oct. 17, 2019

Related U.S. Application Data

(63) Continuation of application No. PCT/CN2016/112327, filed on Dec. 27, 2016.

(51) Int. Cl.
| | | |
|---|---|---|
| *H04W 72/04* | (2009.01) | |
| *H04W 76/27* | (2018.01) | |
| *H04W 48/10* | (2009.01) | |
| *H04W 48/16* | (2009.01) | |
| *H04W 72/12* | (2009.01) | |
| *H04W 76/15* | (2018.01) | |

(52) U.S. Cl.
CPC ....... *H04W 72/0493* (2013.01); *H04W 48/10* (2013.01); *H04W 48/16* (2013.01); *H04W 72/1257* (2013.01); *H04W 76/27* (2018.02); *H04W 76/15* (2018.02)

(58) Field of Classification Search
CPC . H04W 72/0493; H04W 76/27; H04W 48/10; H04W 48/16; H04W 72/1257; H04W 76/15; H04W 72/0406; H04W 88/04
See application file for complete search history.

(56) References Cited

U.S. PATENT DOCUMENTS

| | | | |
|---|---|---|---|
| 10,531,365 B2* | 1/2020 | Kaur ..................... | H04W 24/04 |
| 2011/0124312 A1* | 5/2011 | Kwon, II .............. | H04W 76/50 |
| | | | 455/404.2 |

(Continued)

FOREIGN PATENT DOCUMENTS

| | | |
|---|---|---|
| CN | 103856923 A | 6/2014 |
| CN | 104703224 A | 6/2015 |

(Continued)

OTHER PUBLICATIONS

Sharp, "FeD2D System Information Relaying", 3GPP TSG-RAN WG2#96, Reno, USA, Nov. 14-18, 2016, R2-167642, total 5 pages.

*Primary Examiner* — Tejis Daya
(74) *Attorney, Agent, or Firm* — Slater Matsil, LLP

(57) ABSTRACT

A method for transmitting system information is disclosed. A first terminal device obtains first indication information. The first terminal device, based on the first indication information, determines system information (SI) required by a second terminal device. The second terminal device communicates with a base station via the first terminal device. The first terminal device sends a message comprising target SI to the second terminal device. The target SI is some or all of the SI required by the second terminal device.

22 Claims, 8 Drawing Sheets

(56) References Cited

U.S. PATENT DOCUMENTS

| | | | | |
|---|---|---|---|---|
| 2013/0235839 | A1* | 9/2013 | Kim | H04L 5/0092 |
| | | | | 370/329 |
| 2014/0071957 | A1* | 3/2014 | Xu | H04W 52/0219 |
| | | | | 370/336 |
| 2014/0134970 | A1* | 5/2014 | Pazos | H04L 65/4069 |
| | | | | 455/404.1 |
| 2015/0029866 | A1* | 1/2015 | Liao | H04W 48/14 |
| | | | | 370/241 |
| 2016/0007271 | A1 | 1/2016 | Samuelsson et al. | |
| 2016/0227518 | A1 | 8/2016 | Li et al. | |
| 2016/0360563 | A1* | 12/2016 | Lecroart | H04L 69/322 |
| 2016/0381720 | A1* | 12/2016 | Baek | H04W 76/12 |
| | | | | 370/329 |
| 2017/0127251 | A1* | 5/2017 | Yi | H04W 28/0278 |
| 2017/0223669 | A1 | 8/2017 | Ma et al. | |
| 2018/0084481 | A1* | 3/2018 | Wang | H04W 24/08 |
| 2018/0092027 | A1* | 3/2018 | Sheng | H04W 76/14 |
| 2018/0220356 | A1* | 8/2018 | Tenny | H04W 48/02 |
| 2018/0279110 | A1* | 9/2018 | Sen | H04W 8/005 |
| 2019/0053305 | A1* | 2/2019 | Saiwai | H04W 72/0406 |
| 2019/0173612 | A1* | 6/2019 | Kimura | H04W 56/001 |
| 2019/0320311 | A1* | 10/2019 | Wang | H04W 4/12 |
| 2020/0229114 | A1* | 7/2020 | Ryu | H04W 72/0446 |

FOREIGN PATENT DOCUMENTS

| | | | | |
|---|---|---|---|---|
| CN | 105246066 | A | 1/2016 | |
| CN | 105594293 | A | 5/2016 | |
| CN | 110073685 | A | 7/2019 | |
| EP | 3520450 | A1 | 8/2019 | |
| WO | WO-2014012457 | A1 * | 1/2014 | H04W 76/14 |
| WO | WO-2015095583 | A1 * | 6/2015 | H04W 72/0453 |
| WO | 2015160158 | A1 | 10/2015 | |
| WO | 2016060481 | A1 | 4/2016 | |
| WO | 2016073984 | A2 | 5/2016 | |
| WO | 2016099227 | A1 | 6/2016 | |

* cited by examiner

200

A first terminal device obtains first indication information ~210

The first terminal device determines, based on the first indication information, system information SI required by a second terminal device ~220

The first terminal device sends a message including target SI to the second terminal device, where the target SI is at least some of the SI required by the second terminal device ~230

FIG. 2

METHOD AND DEVICES FOR TRANSMITTING SYSTEM INFORMATION FROM TERMINAL DEVICE

CROSS-REFERENCE TO RELATED APPLICATIONS

This application is a continuation of International Application No. PCT/CN216/112327, filed on Dec. 27, 2016, the disclosure of which is hereby incorporated by reference in its entirety.

TECHNICAL FIELD

Embodiments of the present invention relate to the communications field, and more specifically, to a method for transmitting system information and a terminal device.

BACKGROUND

To access a cell, a terminal device needs to receive system information broadcast by a base station of the cell. If the terminal device is located in coverage of the base station, the terminal device may directly receive the system information broadcast by the base station, or may receive the system information forwarded by a relay terminal device in coverage of the base station. If the terminal device is located out of coverage of the base station, the terminal device can receive the system information only via the relay terminal device in coverage of the base station.

When there is an available relay terminal device near the terminal device, to save power, the terminal device usually chooses to use the relay terminal device to indirectly "camp on" a cell or indirectly access a cell, and the terminal device can receive, via the relay terminal device, the system information broadcast by the base station. When the terminal device receives the system information via the relay terminal device, the relay terminal device does not know information such as system information type required by the terminal device, and consequently the system information forwarded to the terminal device by the relay terminal device includes system information not required by the terminal device. Consequently, there is relatively large signaling between the terminal device and the relay terminal device, signaling overheads are relatively large, and resource waste is caused.

SUMMARY

Embodiments of the present invention provide a method for transmitting system information and a terminal device, to reduce signaling interactions between terminal devices, reduce signaling overheads, and avoid resource waste.

According to a first aspect, a method for transmitting system information is provided, including obtaining, by a first terminal device, first indication information; determining, by the first terminal device based on the first indication information, system information (SI) required by a second terminal device, where the second terminal device indirectly communicates with a base station via the first terminal device; and sending, by the first terminal device, a message including target SI to the second terminal device, where the target SI is at least some or all of the SI required by the second terminal device.

In this embodiment of the present invention, the first terminal device can determine, based on the obtained first indication information of the second terminal device, the system information required by the second terminal device, so that the first terminal device does not send system information not required by the second terminal device to the second terminal device. This reduces signaling interactions between the first terminal device and the second terminal device, reduces signaling overheads, and avoids resource waste.

With reference to the first aspect, in a first implementation of the first aspect, the first indication information includes information indicating a capability supported by the second terminal device; and the determining, by the first terminal device based on the first indication information, SI required by a second terminal device includes: determining, by the first terminal device based on the information about the capability supported by the second terminal device, the SI required by the second terminal device.

With reference to the first aspect, in a second implementation of the first aspect, the first indication information includes information indicating a type of the SI required by the second terminal device.

With reference to any one of the first aspect or the first or the second implementation of the first aspect, in a third implementation of the first aspect, the sending, by the first terminal device, a message including target SI to the second terminal device includes: adding, by the first terminal device, the second terminal device into a target terminal device group, where all terminal devices in the target terminal device group require the target SI; and sending, by the first terminal device, a multicast message to the terminal devices in the target terminal device group, where the multicast message includes the target SI.

In this embodiment of the present invention, the first terminal device adds the second terminal device into the target terminal device group and sends the multicast message to all the terminal devices in the target terminal device group, thereby avoiding sending a same piece of system information to different terminal devices in a unicast manner. This reduces signaling interactions between the first terminal device and the second terminal device, reduces signaling overheads, and avoids resource waste.

With reference to any one of the first aspect or the first or the second implementation of the first aspect, in a fourth implementation of the first aspect, the method further includes: sending, by the first terminal device, a first broadcast message to the second terminal device, where the first broadcast message includes public SI, and the target SI does not include the public SI.

In this embodiment of the present invention, the first terminal device sends a broadcast message including the public system information to the second terminal device, thereby avoiding repeatedly sending the public system information to different terminal devices. This reduces signaling interactions between the first terminal device and the second terminal device, reduces signaling overheads, and avoids resource waste.

With reference to any one of the first aspect or the first or the second implementation of the first aspect, in a fifth implementation of the first aspect, the sending, by the first terminal device, a message including target SI to the second terminal device includes: sending, by the first terminal device, a second broadcast message to the second terminal device, where the second broadcast message is a discovery message or a master information block-SL message, and the discovery message or the master information block-SL message carries the target SI.

With reference to any one of the first aspect or the first or the second implementation of the first aspect, in a sixth implementation of the first aspect, the sending, by the first terminal device, a message including target SI to the second terminal device includes: receiving, by the first terminal device, system information broadcast by the base station; extracting, by the first terminal device, the target SI from the system information broadcast by the base station; generating, by the first terminal device, a Radio Resource Control (RRC) message, where the RRC message includes the target SI; and sending, by the first terminal device, the RRC message to the second terminal device.

In this embodiment of the present invention, the first terminal device can reconstruct a plurality of pieces of system information required by the second terminal device into one RRC message, by reconstructing the system information required by the second terminal device into the RRC message. This reduces signaling interactions between the first terminal device and the second terminal device, reduces signaling overheads, and avoids resource waste.

With reference to any one of the first aspect or the first to the sixth implementations of the first aspect, in a seventh implementation of the first aspect, the obtaining, by a first terminal device, first indication information includes: receiving, by the first terminal device, the first indication information sent by the second terminal device.

With reference to any one of the first aspect or the first to the sixth implementations of the first aspect, in an eighth implementation of the first aspect, the obtaining, by a first terminal device, first indication information includes: receiving, by the first terminal device, the first indication information sent by the base station or a mobility management entity (MME).

With reference to any one of the first aspect or the first to the eighth implementations of the first aspect, in a ninth implementation of the first aspect, the sending, by the first terminal device, a message including target SI to the second terminal device includes: when the first terminal device receives a paging message indicating a system information change, sending, by the first terminal device to the second terminal device, system information other than a master information block (MIB), and a system information block (SIB) 1, a SIB 10, a SIB 11, a SIB 12, and a SIB 14 in a SIB.

With reference to any one of the first aspect or the first to the eighth implementations of the first aspect, in a tenth implementation of the first aspect, the second terminal device is a terminal device supporting an extended access barring EAB capability, and the target SI includes a SIB 14; and the sending, by the first terminal device, a message including target SI to the second terminal device includes: when the first terminal device receives a paging message indicating an EAB parameter change, sending, by the first terminal device, an updated SIB 14 to the second terminal device.

With reference to any one of the first aspect or the first to the eighth implementations of the first aspect, in an eleventh implementation of the first aspect, the second terminal device is a terminal device supporting an earthquake and tsunami warning system ETWS capability, and the target SI includes a SIB 10 and a SIB 11; and the sending, by the first terminal device, a message including target SI to the second terminal device includes: when the first terminal device receives a paging message indicating that there is an ETWS primary notification, sending, by the first terminal device, the SIB 10 to the second terminal device; or when the first terminal device receives a paging message indicating that there is an ETWS secondary notification, sending, by the first terminal device, the SIB 11 to the second terminal device.

With reference to any one of the first aspect or the first to the eighth implementations of the first aspect, in a twelfth implementation of the first aspect, the second terminal device is a terminal device supporting a commercial mobile alert service CMAS capability, and the target SI includes a SIB 12; and the sending, by the first terminal device, a message including target SI to the second terminal device includes: when the first terminal device receives a paging message indicating that there is a CMAS notification, sending, by the first terminal device, the SIB 12 to the second terminal device.

With reference to any one of the first aspect or the first to the eighth implementations of the first aspect, in a thirteenth implementation of the first aspect, the sending, by the first terminal device, a message including target SI to the second terminal device includes: after a communication connection is established between the first terminal device and the second terminal device, sending, by the first terminal device, the target SI to the second terminal device; or when the first terminal device performs or completes cell reselection and handover, sending, by the first terminal device, the target SI to the second terminal device.

With reference to any one of the first aspect or the first to the eighth implementations of the first aspect, in a fourteenth implementation of the first aspect, the sending, by the first terminal device, a message including target SI to the second terminal device includes: when the first terminal device detects that a SIB 1 changes, sending, by the first terminal device to the second terminal device, an updated SIB 1 or a parameter required by the second terminal device in an updated SIB 1; or when the first terminal device detects that a parameter required by the second terminal device in a SIB 1 changes, sending, by the first terminal device to the second terminal device, an updated SIB 1 or a parameter required by the second terminal device in an updated SIB 1.

With reference to any one of the first aspect or the first to the fourteenth implementations of the first aspect, in a fifteenth implementation of the first aspect, the second terminal device is a wearable device.

According to a second aspect, a method for transmitting system information is provided, including: generating, by a second terminal device, first indication information, where the first indication information indicates system information SI required by the second terminal device; sending, by the second terminal device, the first indication information to a first terminal device, where the second terminal device communicates with a base station via the first terminal device; and receiving, by the second terminal device, a message that includes target SI and that is sent by the first terminal device, where the target SI is at least some or all of the SI required by the second terminal device.

With reference to the second aspect, in a first implementation of the second aspect, the first indication information includes information indicating a capability supported by the second terminal device.

With reference to the second aspect, in a second implementation of the second aspect, the first indication information includes information indicating a type of the SI required by the second terminal device.

With reference to any one of the second aspect or the first or the second implementation of the second aspect, in a third implementation of the second aspect, the receiving, by the second terminal device, a message that includes target system information SI and that is sent by the first terminal device includes: receiving, by the second terminal device, a multicast message sent by the first terminal device to a target terminal device group, where the second terminal device is a terminal device in the target terminal device group, all terminal devices in the target terminal device group require the target SI, and the multicast message includes the target SI.

With reference to any one of the second aspect or the first or the second implementation of the second aspect, in a fourth implementation of the second aspect, the method further includes: receiving, by the second terminal device, a first broadcast message sent by the first terminal device, where the first broadcast message includes public SI, and the target SI does not include the public SI.

With reference to any one of the second aspect or the first or the second implementation of the second aspect, in a fifth implementation of the second aspect, the receiving, by the second terminal device, a message that includes target system information SI and that is sent by the first terminal device includes: receiving, by the second terminal device, a second broadcast message sent by the first terminal device, where the second broadcast message is a discovery message or a master information block-SL message, and the discovery message or the master information block-SL message carries the target SI.

With reference to any one of the second aspect or the first or the second implementation of the second aspect, in a sixth implementation of the second aspect, the receiving, by the second terminal device, a message that includes target system information SI and that is sent by the first terminal device includes: receiving, by the second terminal device, a Radio Resource Control RRC message generated by the first terminal device, where the RRC message includes the target SI.

With reference to any one of the second aspect or the first to the sixth implementations of the second aspect, in a seventh implementation of the second aspect, the second terminal device is a wearable device.

According to a third aspect, a terminal device is provided, and the terminal device includes one or more modules configured to perform the method in the first aspect.

According to a fourth aspect, a terminal device is provided, and the terminal device includes one or more modules configured to perform the method in the second aspect.

According to a fifth aspect, a terminal device is provided, and the terminal device includes a memory and a processor, where the memory is configured to store program code, and the processor is configured to invoke the program code to implement the method according to the first aspect and the implementations of the first aspect.

According to a sixth aspect, a terminal device is provided, and the terminal device includes a memory and a processor, where the memory is configured to store program code, and the processor is configured to invoke the program code to implement the method according to the second aspect and the implementations of the second aspect.

According to a seventh aspect, a computer readable medium is provided, where the computer readable medium is configured to store program code executable by the terminal device, and the program code includes instructions used to perform the method according to the first aspect and the implementations of the first aspect.

According to an eighth aspect, a computer readable medium is provided, where the computer readable medium is configured to store program code executable by the terminal device, and the program code includes instructions used to perform the method according to the second aspect and the implementations of the second aspect.

BRIEF DESCRIPTION OF THE DRAWINGS

FIG. 2 is a schematic flowchart of a method for transmitting system information according to an embodiment of the present invention;

DETAILED DESCRIPTION OF ILLUSTRATIVE EMBODIMENTS

The following clearly describes the technical solutions in the embodiments of the present invention with reference to the accompanying drawings in the embodiments of the present invention.

Figure 1:
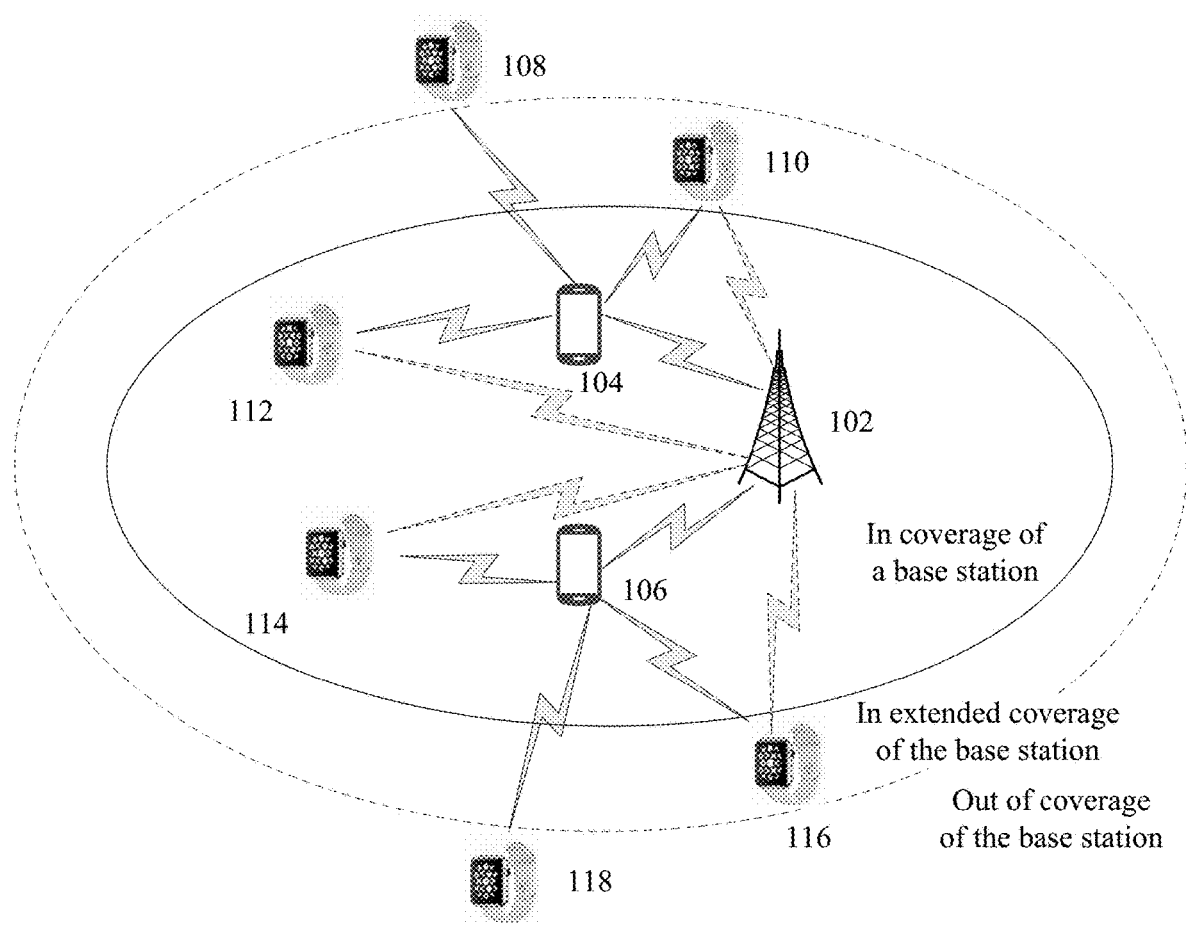
FIG. 1 is a schematic architecture diagram of an application scenario according to an embodiment of the present invention.

FIG. 1 is a schematic architecture diagram of an application scenario according to an embodiment of the present invention. As shown in FIG. 1, a network 100 may include a base station 102, first terminal devices 104 and 106, and second terminal devices 108, 110, 112, 114, 116, and 118. The base station, the first terminal devices, and the second terminal devices may be wirelessly connected to each other.

When the base station 102 broadcasts system information, the first terminal devices 104 and 106 located in coverage (IC) of the base station 102 may directly receive the system information broadcast by the base station; the second terminal devices 112 and 114 located in coverage of the base station 102 and the second terminal devices 110 and 116 located in extended coverage (EC) of the base station 102 each may also directly receive the system information broadcast by the base station, or may receive the system information forwarded by the first terminal devices 104 and 106; and the second terminal devices 108 and 118 located out of coverage (OOC) of the base station 102 need to receive, via the first terminal devices 104 and 106, the system information broadcast by the base station.

Based on the application scenario in FIG. 1, an embodiment of the present invention provides a method for transmitting system information. A first terminal device obtains first indication information of a second terminal device, so that the first terminal device can know a system information type required by the second terminal device, and the first terminal device does not send system information not required by the second terminal device to the second terminal device. This can reduce signaling interactions between the first terminal device and the second terminal device, reduce signaling overheads, and avoid resource waste. The following describes the method in detail with reference to FIG. 2.

FIG. 2 is a schematic flowchart of a method 200 for transmitting system information according to an embodiment of the present invention. The method 200 may be performed by a first terminal device, for example, the first terminal device 104 or the first terminal device 106 in the network 100. The method 200 shown in FIG. 2 includes the following steps.

210. The first terminal device obtains first indication information.

220. The first terminal device determines, based on the first indication information, system information (SI) required by a second terminal device, where the second terminal device communicates with a base station via the first terminal device.

230. The first terminal device sends a message including target SI to the second terminal device, where the target SI is at least some of the SI required by the second terminal device.

In this embodiment of the present invention, the first terminal device can determine, based on the obtained first indication information of the second terminal device, the system information SI required by the second terminal device, so that the first terminal device forwards the system information required by the second terminal device to the second terminal device. This reduces signaling interactions between the first terminal device and the second terminal device, reduces signaling overheads, and avoids resource waste.

It should be understood that the target SI or the SI required by the second terminal device may be a system information block (SIB) and/or some parameters in a SIB, or may be a set of all parameters that the second terminal device needs to receive.

Optionally, in some embodiments, the first terminal device may be a relay terminal device, for example, a smartphone; and the second terminal device may be a wearable device (WD), for example, a smartwatch or a smart band. However, this embodiment of the present invention is not limited thereto.

It should be understood that in this embodiment of the present invention, a communication connection is established between the first terminal device and the second terminal device, and the communication connection may be, for example, a pairing relationship established based on a Bluetooth technology, or an association relationship established based on a wireless local area network (WLAN) technology, or a connection relationship established based on a device-to-device (D2D) technology in a Long Term Evolution (LTE) technology.

In this embodiment of the present invention, the communication connection established between the first terminal device and the second terminal device is described only by using the pairing relationship, the association relationship, and the connection relationship. However, this embodiment of the present invention is not limited thereto.

It should be understood that after the communication connection is established between the first terminal device and the second terminal device, to save power, the second terminal device usually chooses the first terminal device as a relay device to communicate with the base station, even if the second terminal device in coverage of the base station. For example, when a D2D connection is established between a wearable device WD and a relay terminal device, the wearable device receives system information via the relay terminal device in most cases.

Optionally, in some embodiments, the first indication information may be a capability supported by the second terminal device.

For example, the first indication information may be an extended access barring (EAB) capability supported by the second terminal device, or may be an earthquake and tsunami warning system (ETWS) capability supported by the second terminal device, or may be a commercial mobile alert service (CMAS) capability supported by the second terminal device, or may be a service specific access control (SSAC) capability supported by the second terminal device, or an application specific congestion control for data communication (ACDC) capability supported by the second terminal device.

In this embodiment of the present invention, the first indication information is described only by using the foregoing five types of capabilities supported by the second terminal device. However, this embodiment of the present invention is not limited thereto.

Optionally, in some embodiments, the first indication information may be alternatively of a system information type required by the second terminal device.

Optionally, in some embodiments, that the first terminal device obtains first indication information may be that the first terminal device receives the first indication information sent by the second terminal device. To be specific, the second terminal device reports the capability supported by the second terminal device or the system information type required by the second terminal device to the first terminal device.

Optionally, in some embodiments, that the first terminal device obtains first indication information may be alternatively: The first terminal device receives the first indication information sent by the base station or a mobility management entity (MME). When accessing a network for the first time, the second network device may register with an MME or a base station of a cell in which the second terminal device is located, the capability supported by the second terminal device or the system information type required by the second terminal device, namely, the first indication information. When the first terminal device needs to obtain the first indication information of the second terminal device, the base station or the MME may send, to the first terminal device, the first indication information that is prestored in the base station by the second terminal device.

In this embodiment of the present invention, the first terminal device receives the first indication information sent by the base station or the MME, to prevent the second terminal device from sending the first indication information to the first terminal device. This reduces signaling interactions between the first terminal device and the second terminal device, reduces signaling overheads, and helps the second terminal device save power.

Figure 3:
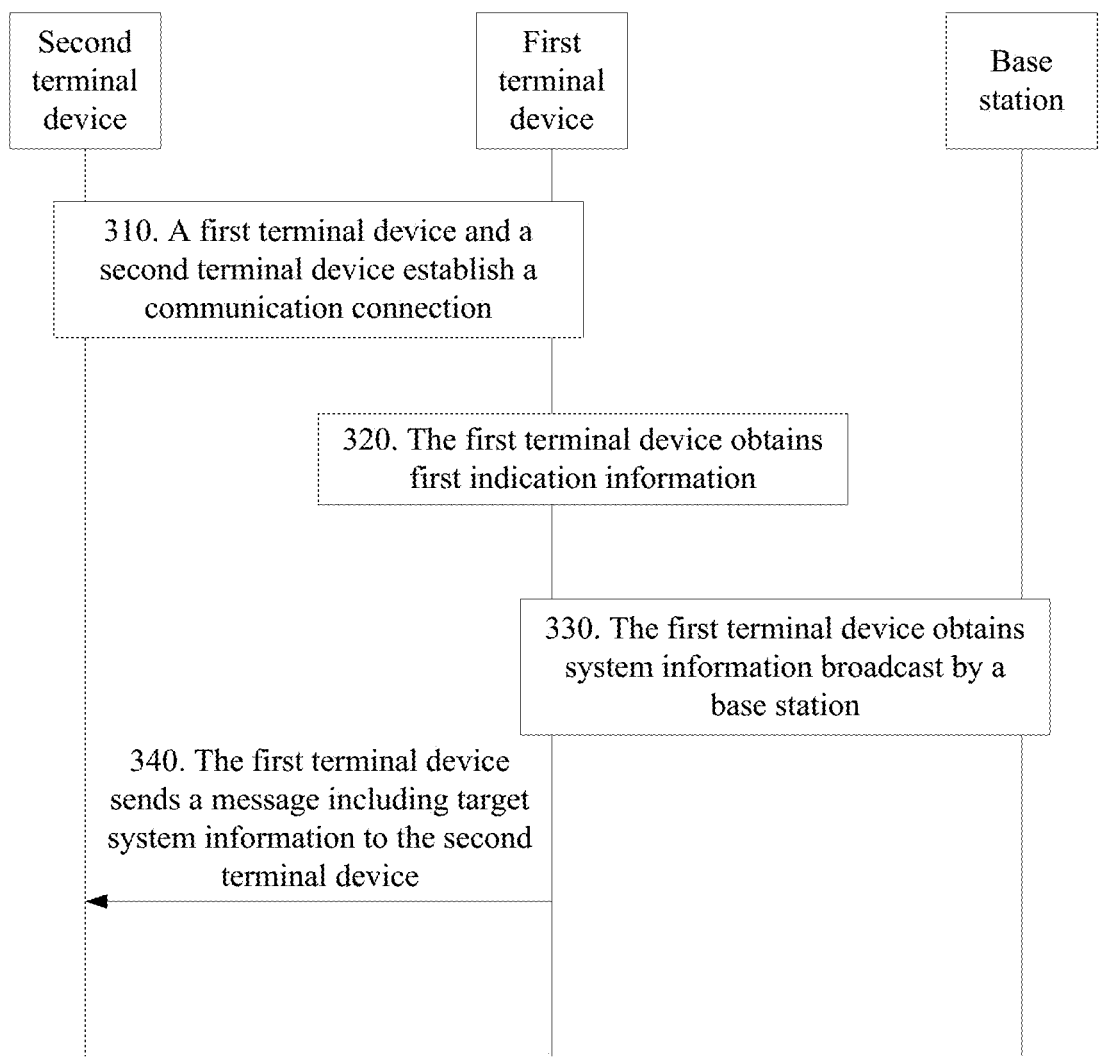
FIG. 3 is another schematic flowchart of a method for transmitting system information according to an embodiment of the present invention.

FIG. 3 is a schematic flowchart of a method 300 for transmitting system information according to an embodiment of the present invention.

In 310, a first terminal device and a second terminal device establish a communication connection.

Optionally, in some embodiments, the communication connection may be a Bluetooth connection, or may be a WLAN connection, or may be a D2D connection.

In 320, the first terminal device obtains first indication information.

Optionally, in some embodiments, the first indication information may be a capability supported by the second terminal device.

For example, the first indication information may be an EAB capability supported by the second terminal device, or may be an ETWS capability supported by the second terminal device, or may be a CMAS capability supported by the second terminal device, or may be an SSAC capability supported by the second terminal device, or may be an ACDC capability supported by the second terminal device.

It should be understood that in this embodiment of the present invention, the capability supported by the second terminal device is described only by using the foregoing five types of capabilities. However, this embodiment of the present invention is not limited thereto.

Optionally, in some embodiments, the first indication information may be alternatively of a system information type required by the second terminal device.

Optionally, in some embodiments, that the first terminal device obtains first indication information may be that the first terminal device receives the first indication information sent by the second terminal device.

Optionally, in some embodiments, that the first terminal device obtains first indication information may be alternatively that the first terminal device receives the first indication information sent by a base station.

In 330, the first terminal device obtains system information broadcast by a base station.

When broadcasting the system information, the base station broadcasts a master information block (MIB) and a SIB 1 in a SIB by using two separate Radio Resource Control (RRC) messages, and may broadcast SIBs other than the MIB and the SIB 1 by using a plurality of RRC messages, and a plurality of SIBs may be put into one RRC message and broadcast by the base station.

In 340, the first terminal device sends a message including target SI to the second terminal device.

Optionally, in some embodiments, the target SI is at least some of the SI required by the second terminal device.

Optionally, in some embodiments, that the first terminal device sends a message including target SI to the second terminal device may be: When the first terminal device receives a paging message indicating a system information SI change, after the first terminal device receives updated system information broadcast by a cell, the first terminal device sends, to the second terminal device, updated system information other than the MIB, the SIB 1, a SIB 10, a SIB 11, a SIB 12, and a SIB 14 in the SI required by the second terminal device. That is, the first terminal device sends the target SI to the second terminal device, and the target SI is some of the SI required by the second terminal device.

It should be understood that the base station may indicate, by using the paging message, that system information other than the MIB, the SIB 1, the SIB 10, the SIB 11, the SIB 12, and the SIB 14 changes.

The base station may alternatively modify a value of SystemInfoValueTag in the SIB 1 to indicate that system information other than the MIB, the SIB 1, the SIB 10, the SIB 11, the SIB 12, and the SIB 14 changes. The value of SystemInfoValueTag is used to indicate whether the system information changes. A value range of SysteminfoValueTag is 0-31. When the system information changes, a value of SystemInfoValueTag is incremented by 1. Therefore, whether the system information changes can be determined based on whether the value of SystemInfoValueTag changes.

Optionally, in some embodiments, when the second terminal device is a terminal device supporting the EAB capability, the target SI sent by the first terminal device to the second terminal device is a SIB 14.

To be specific, that the first terminal device sends a message including target SI to the second terminal device may be: When the first terminal device receives a paging message indicating an EAB parameter change, the first terminal device sends an updated SIB 14 to the second terminal device.

It should be understood that when the first terminal device receives the paging message indicating the EAB parameter change, the first terminal device first needs to receive the SIB 1 broadcast by the base station and check a scheduling information list field (Scheduling InfoList) in the SIB 1 to determine whether the scheduling information list field includes a SIB 14 scheduling information; and when the scheduling information list field includes the SIB 14 scheduling information, the first terminal device receives the SIB 14 scheduling information based on scheduling information and sends the updated SIB 14 to the second terminal device.

Optionally, in some embodiments, when the second terminal device is a terminal device supporting the ETWS capability, the target SI sent by the first terminal device to the second terminal device is a SIB 10 and/or a SIB 11.

To be specific, that the first terminal device sends a message including target SI to the second terminal device may be: when the first terminal device receives a paging message indicating that there is an ETWS primary notification, the first terminal device sends the SIB 10 to the second terminal device; or when the first terminal device receives a paging message indicating that there is an ETWS secondary notification, the first terminal device sends the SIB 11 to the second terminal device.

It should be understood that when the first terminal device receives the paging message indicating that there is the ETWS primary notification, the first terminal device first receives the SIB 1 and checks a scheduling information list field in the SIB 1 to determine whether the scheduling information list field indicates that there is the SIB 10 scheduling information; and if the scheduling information list field indicates that there is the SIB 10 scheduling information, the first terminal device receives the SIB 10 scheduling information based on scheduling information and sends the SIB 10 scheduling information to the second terminal device.

Likewise, when the first terminal device receives the paging message indicating that there is the ETWS secondary notification, the first terminal device first receives the SIB 1 and checks a scheduling information list field in the SIB 1 to determine whether the scheduling information list field indicates that there is the SIB 11 scheduling information; and if the scheduling information list field indicates that there is the SIB 11 scheduling information, the first terminal device receives the SIB 11 scheduling information based on scheduling information and sends the SIB 11 scheduling information to the second terminal device.

Optionally, in some embodiments, when the second terminal device is a terminal device supporting the CMAS capability, the target SI sent by the first terminal device to the second terminal device is a SIB 12.

To be specific, that the first terminal device sends a message including target SI to the second terminal device may be: When the first terminal device receives a paging message indicating that there is a CMAS notification, the first terminal device sends the SIB 12 to the second terminal device.

It should be understood that when the first terminal device receives the paging message indicating that there is the CMAS notification, the first terminal device first receives the SIB 1 and checks a scheduling information list field in the SIB 1 to determine whether the scheduling information list field indicates that there is the SIB 12 scheduling information; and if the scheduling information list field indicates that there is the SIB 12 scheduling information, the first terminal device receives the SIB 12 scheduling information based on scheduling information and sends the SIB 12 scheduling information to the second terminal device.

Optionally, in some embodiments, after a communication connection relationship, a pairing relationship, or an association relationship is established between the first terminal device and the second terminal device, the first terminal device sends the target SI to the second terminal device, and the target SI is all of the SI required by the second terminal device.

Optionally, in some embodiments, when the first terminal device performs cell reselection, intra-frequency handover, inter-frequency handover, and inter-RAT handover, after the first terminal device receives system information SI of a target cell on which cell reselection, intra-frequency handover, inter-frequency handover, and inter-RAT handover are performed, the first terminal device sends the target SI to the second terminal device, and the target SI is all of the system information SI required by the second terminal device.

For example, the first terminal device may determine, based on the first indication information, that system information currently required by the second terminal device is a SIB 1, a SIB 2, a SIB 14, a SIB 18, and a SIB 19. When the first terminal device performs or completes cell reselection, intra-frequency handover, inter-frequency handover, or inter-RAT handover, the first terminal device sends, to the second terminal device, the following system information: a MIB, the SIB 1, the SIB 2, the SIB 14, the SIB 18, and the SIB 19. In other words, the first terminal device sends all system information required by the second terminal device to the second terminal device.

Optionally, in some embodiments, when the first terminal device detects that the SIB 1 changes, after the first terminal device receives updated system information broadcast by a cell, the first terminal device sends, to the second terminal device, an updated SIB 1 or a parameter required by the second terminal device in an updated SIB 1.

Optionally, in some embodiments, when the first terminal device detects that a parameter required by the second terminal device in the SIB 1 changes, after the first terminal device receives updated system information broadcast by a cell, the first terminal device sends, to the second terminal device, an updated SIB 1 or a parameter required by the second terminal device in an updated SIB 1.

It should be understood that the first terminal device may determine, by checking a MIB or a SIB 1 broadcast by the base station, whether a MIB or a SIB 1 in the system information change.

Optionally, in some embodiments, the first terminal device may be a relay terminal device, for example, a smartphone; and the second terminal device may be a wearable device, for example, a smartwatch or a smart band. However, this embodiment of the present invention is not limited thereto.

In this embodiment of the present invention, the first terminal device may send the system information required by the second terminal device to the second terminal device based on the capability supported by the second terminal device or directly based on the system information type required by the second terminal device, so that the first terminal device does not send system information not required by the second terminal device to the second terminal device. This reduces signaling interactions between the first terminal device and the second terminal device, reduces signaling overheads, and avoids resource waste.

Figure 4:
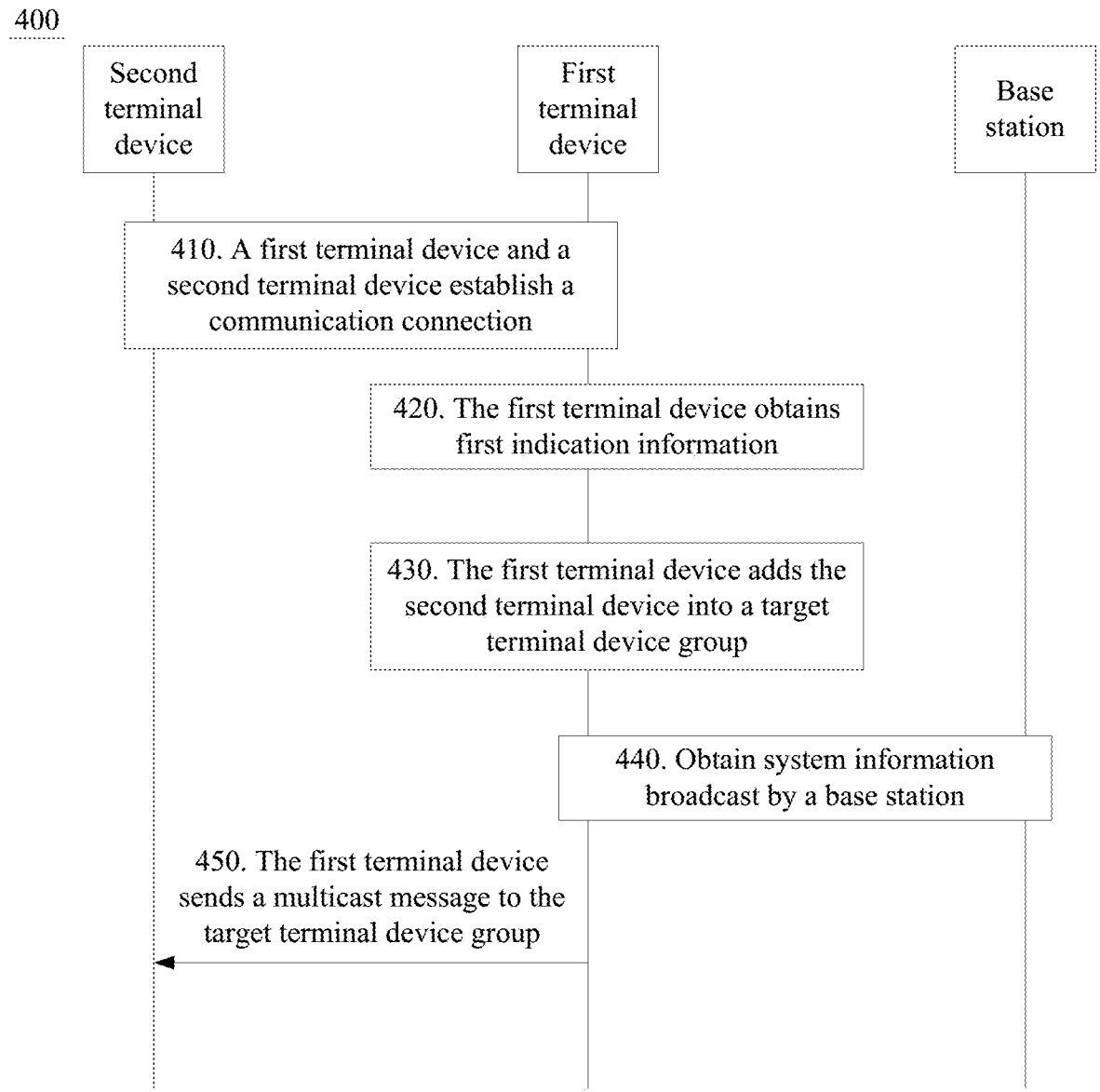
FIG. 4 is still another schematic flowchart of a method for transmitting system information according to an embodiment of the present invention.

FIG. 4 is a schematic flowchart of a method 400 for transmitting system information according to an embodiment of the present invention.

In 410, a first terminal device and a second terminal device establish a communication connection.

Optionally, in some embodiments, the communication connection may be a Bluetooth connection, or may be a WLAN connection, or may be a D2D connection.

In 420, the first terminal device obtains first indication information.

Optionally, in some embodiments, the first indication information may be a capability supported by the second terminal device.

For example, the first indication information may be an EAB capability supported by the second terminal device, or may be an ETWS capability supported by the second terminal device, or may be a CMAS capability supported by the second terminal device, or may be an SSAC capability supported by the second terminal device, or may be an ACDC capability supported by the second terminal device.

It should be understood that in this embodiment of the present invention, the capability supported by the second terminal device is described only by using the foregoing five types of capabilities. However, this embodiment of the present invention is not limited thereto.

Optionally, in some embodiments, the first indication information may be alternatively of a system information type required by the second terminal device.

Optionally, in some embodiments, that the first terminal device obtains first indication information may be: The first terminal device receives the first indication information sent by the second terminal device.

Optionally, in some embodiments, that the first terminal device obtains first indication information may be alternatively: The first terminal device receives the first indication information sent by a base station or an MME.

In 430, the first terminal device adds the second terminal device into a target terminal device group.

Optionally, in some embodiments, all terminal devices in the target terminal device group need target system information SI.

Optionally, in some embodiments, that the first terminal device adds the second terminal device into a target terminal device group may be: The first terminal device obtains, based on the first indication information obtained by the first terminal device, a second terminal device that corresponds to each SIB and that requires the SIB, generates a list of second terminal devices corresponding to SIBs, and adds the second terminal device into the target terminal device group based on the list.

For example, it is assumed that at a current moment, communication connections are established between the first terminal device and six second terminal devices: second terminal devices #1-#6; after obtaining first indication information of the six second terminal devices, the first terminal device may obtain, based on the first indication information, a list of second terminal devices, as shown in Table 1, that are corresponding to SIBs and that require the SIBs; and the first terminal device may add a current second terminal device into the target terminal device group based on the list, and the target terminal device group includes the current second terminal device.

TABLE 1

Second terminal device corresponding to each SIB

| SIB type | Second terminal device requiring a corresponding SIB |
| --- | --- |
| SIB 1 | #1-#6 |
| SIB 2 | #1-#6 |
| SIB 10 | #2 |
| SIB 11 | #2 |
| SIB 12 | #1, #2, and #5 |
| SIB 13 | #3 and #6 |
| SIB 14 | #1, #3, #4, and #6 |
| SIB 15 | #3 and #6 |
| SIB 17 | None |
| SIB 18 | #4 and #6 |
| SIB 19 | #4 and #6 |
| SIB 20 | None |

Each row in Table 1 shows a terminal device requiring the SIB. For example, it can be determined based on the first indication information that system information required by a current second terminal device is a SIB 1, and therefore the current second terminal device can be added into a target terminal device group shown in the second row in Table 1, and all terminal devices in the target terminal device group need the SIB 1.

For another example, it can be determined based on the first indication information that system information required by a current second terminal device is a SIB 12, and therefore the current second terminal device can be added into a target terminal device group shown in the sixth row in Table 1, and all terminal devices in the target terminal device group need the SIB 12.

In 440, the first terminal device obtains system information broadcast by a base station.

In 450, the first terminal device sends a multicast message to the target terminal device group.

After the first terminal device adds the second terminal device into the target terminal device group, because all terminal devices in the target terminal device group require the target SI, the first terminal device may send a multicast message to the target terminal device group, and the multicast message includes the target SI. To be specific, the first terminal device sends, in a multicast manner, the target SI required by the second terminal device to all terminal devices requiring the target SI.

Optionally, in some embodiments, that the first terminal device sends a multicast message to the target terminal device group may be: When the first terminal device receives a paging message indicating a system information change, the first terminal device sends updated system information other than a MIB, a SIB 1, a SIB 10, a SIB 11, a SIB 12, and a SIB 14 in the target SI to the target terminal device group in the multicast manner, and the target terminal device group includes the second terminal device.

To be specific, when the first terminal device receives the paging message indicating the system information change, the first terminal device sends the updated system information other than the MIB, the SIB 1, the SIB 10, the SIB 11, the SIB 12, and the SIB 14 to the second terminal device in the multicast manner.

Optionally, in some embodiments, that the first terminal device sends a multicast message to the target terminal device group may be alternatively: When the second terminal device is a terminal device supporting the EAB capability, the first terminal device sends a SIB 14 to all terminal devices in the target terminal device group that require the SIB 14, and the target terminal device group includes the second terminal device.

To be specific, when the first terminal device receives a paging message indicating an EAB parameter change, the first terminal device sends an updated SIB 14 to the second terminal device in the multicast manner.

Optionally, in some embodiments, that the first terminal device sends a multicast message to the target terminal device group may be alternatively: When the second terminal device is a terminal device supporting the ETWS capability, the first terminal device sends a SIB 10 and/or a SIB 11 to all terminal devices in the target terminal device group that require the SIB 10 and/or the SIB 11, and the target terminal device group includes the second terminal device.

To be specific, that the first terminal device sends a message including target SI to the second terminal device may be: When the first terminal device receives a paging message indicating that there is an ETWS primary notification, the first terminal device sends the SIB 10 to the second terminal device; or when the first terminal device receives a paging message indicating that there is an ETWS secondary notification, the first terminal device sends the SIB 11 to the second terminal device.

Optionally, in some embodiments, that the first terminal device sends a multicast message to the target terminal device group may be alternatively: When the second terminal device is a terminal device supporting the CMAS capability, the first terminal device sends a SIB 12 to all terminal devices in the target terminal device group that require the SIB 12, and the target terminal device group includes the second terminal device.

To be specific, when the first terminal device receives a paging message indicating that there is a CMAS notification, the first terminal device sends a SIB 12 to the second terminal device in the multicast manner.

Optionally, in some embodiments, after a communication connection relationship, a pairing relationship, or an association relationship is established between the first terminal device and the second terminal device, the first terminal device sends the target SI to the second terminal device in a unicast or multicast manner.

It should be understood that the target terminal device group may include only one second terminal device. For example, a target terminal device group corresponding to the SIB 10 and a target terminal device group corresponding to the SIB 11 shown in Table 1 each include only one second terminal device WD #2. In this case, the multicast message sent by the first terminal device to the target terminal device group may be a unicast message.

It should be understood that the target terminal device group may alternatively include all second terminal devices in the communication connection relationship, the pairing relationship, the association relationship, or a connection relationship with the first terminal device. For example, a target terminal device group corresponding to the SIB 1 and a target terminal device group corresponding to the SIB 2 shown in Table 1 each include all second terminal devices WD #1-WD #6 communicatively connected to the first terminal device. In this case, the multicast message sent by the first terminal device to the target terminal device group may be a broadcast message.

Optionally, in some embodiments, that the first terminal device sends a multicast message to the target terminal device group may be alternatively: When the first terminal device performs or completes cell reselection, intra-frequency handover, inter-frequency handover, and inter-RAT handover, the first terminal device sends the target SI to all terminal devices in the target terminal device group in the multicast manner, and the target terminal device group includes the second terminal device.

To be specific, when the first terminal device performs or completes cell reselection, intra-frequency handover, inter-frequency handover, and inter-RAT handover, the first terminal device sends corresponding target SI to each target terminal device group in the multicast manner, and the target SI is SI required by all second terminal devices in the target terminal device group.

It should be understood that system information types required by different second terminal devices may partially overlap with each other, and therefore a same second terminal device may belong to a plurality of target terminal device groups. Therefore, all system information required by the second terminal device is likely to include a plurality of pieces of target SI, and the plurality of pieces of target SI are included in multicast messages corresponding to different target terminal device groups and sent to the second terminal device.

Optionally, in some embodiments, when the first terminal device detects that a SIB 1 in the system information SI changes, the first terminal device sends, to all terminal devices in the multicast manner, an updated SIB 1 or a parameter required by the second terminal device in an updated SIB 1.

Optionally, in some embodiments, when the first terminal device detects that a parameter required by the second terminal device in the SIB 1 changes, the first terminal device sends, to terminal devices in all terminal device groups in the multicast manner, an updated SIB 1 or a parameter required by the second terminal device in an updated SIB 1.

Optionally, in some embodiments, the first terminal device may be a relay terminal device, for example, a smartphone; and the second terminal device may be a wearable device, for example, a smartwatch or a smart band. However, this embodiment of the present invention is not limited thereto.

In this embodiment of the present invention, the first terminal device adds the second terminal device into the target terminal device group and sends the multicast message including the target SI to a terminal device in the target terminal device group, so that all terminal devices in the target terminal device group can receive the target SI required by the terminal device. In this case, the first terminal device does not need to send a same SIB to different terminal devices in a unicast manner, thereby reducing signaling interactions between the first terminal device and the second terminal device. This reduces signaling overheads, avoids resource waste, and helps the first terminal device and the second terminal device save power.

Figure 5:
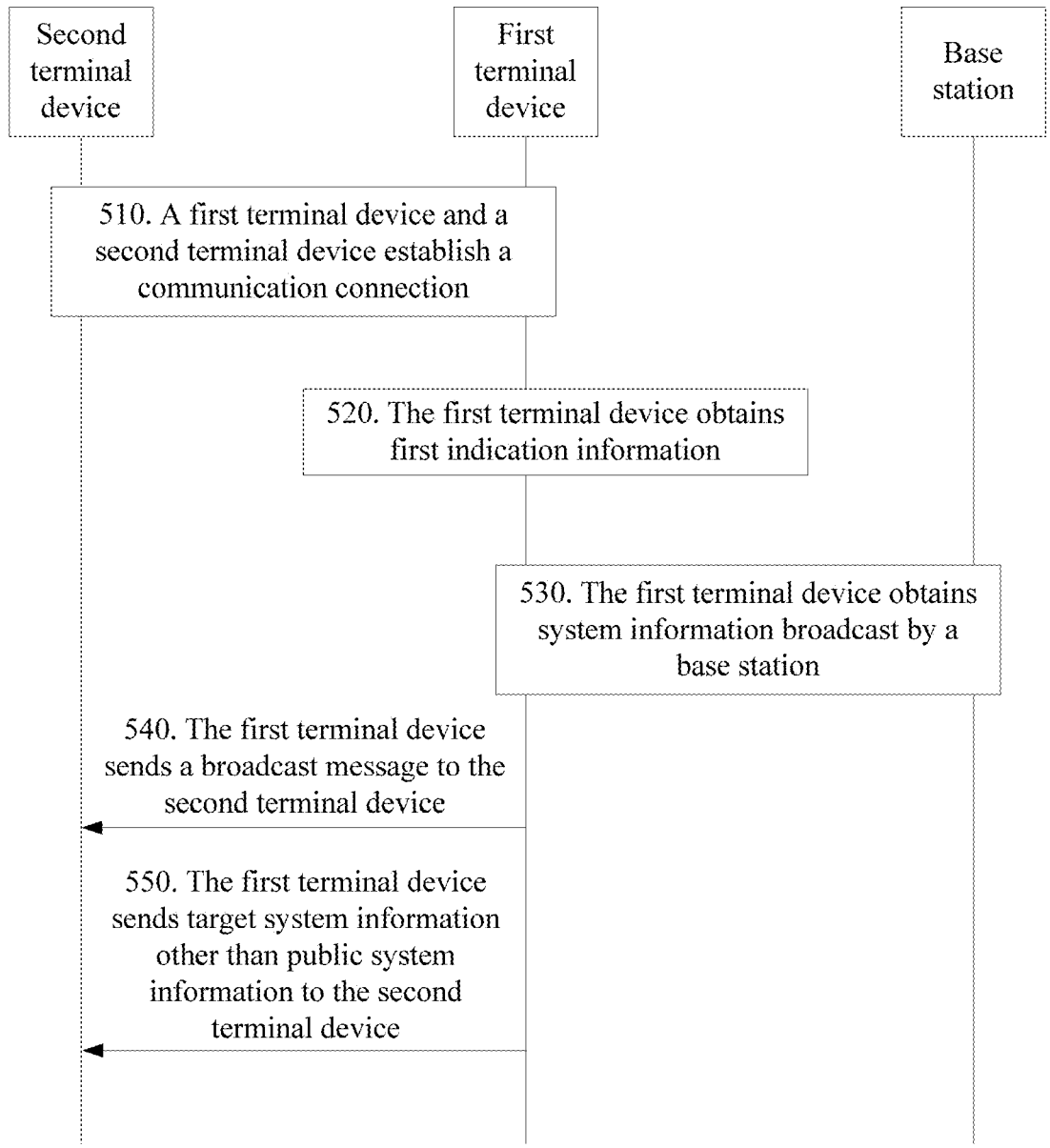
FIG. 5 is yet another schematic flowchart of a method for transmitting system information according to an embodiment of the present invention.

FIG. 5 is a schematic flowchart of a method 500 for transmitting system information according to an embodiment of the present invention.

In 510, a first terminal device and a second terminal device establish a communication connection.

Optionally, in some embodiments, the communication connection may be a Bluetooth connection, or may be a WLAN connection, or may be a D2D connection.

In 520, the first terminal device obtains first indication information.

Optionally, in some embodiments, the first indication information may be a capability supported by the second terminal device.

For example, the first indication information may be an EAB capability supported by the second terminal device, or may be an ETWS capability supported by the second terminal device, or may be a CMAS capability supported by the second terminal device, or may be an SSAC capability supported by the second terminal device, or may be an ACDC capability supported by the second terminal device.

It should be understood that in this embodiment of the present invention, the capability supported by the second terminal device is described only by using the foregoing five types of capabilities. However, this embodiment of the present invention is not limited thereto.

Optionally, in some embodiments, the first indication information may be alternatively of a system information type required by the second terminal device.

In this embodiment of the present invention, the first terminal device may send system information required by the second terminal device to the second terminal device based on the capability supported by the second terminal device or directly based on the system information type required by the second terminal device, so that the first terminal device does not send system information unnecessary for the second terminal device to the second terminal device. This reduces signaling overheads between the first terminal device and the second terminal device, and avoids resource waste.

Optionally, in some embodiments, that the first terminal device obtains first indication information may be: The first terminal device receives the first indication information sent by the second terminal device.

Optionally, in some embodiments, that the first terminal device obtains first indication information may be alternatively: The first terminal device receives the first indication information sent by a base station or an MME.

It should be understood that a second terminal device with only a basic capability only needs to receive public system information SI, namely, system information or a parameter required by all second terminal devices, and therefore when obtaining the first indication information, the first terminal device may not obtain first indication information of the second terminal device with only the basic capability.

In 530, the first terminal device obtains system information broadcast by a base station.

In 540, the first terminal device sends a broadcast message to the second terminal device.

Optionally, in some embodiments, the broadcast message sent by the first terminal device to the second terminal device may be the public system information SI or some parameters in the public system information SI. The public SI or the some parameters in the public SI are system information or parameters in system information that all terminal devices need to receive.

For example, when a D2D connection is established between the first terminal device and the second terminal device, all the following parameters may be some content in the public system information SI broadcast by the first terminal device: parameters in a SIB 1 such as a cell identity (Cell ID), a cell barred state, a cell reserved for operator use state, a closed subscriber group identity (CSG Identity), a closed subscriber group indication (CSG Indication), a tracking area code, a system information value tag (SystemInfoValueTag), a category o allowed (Category o Allowed) indication, a public land mobile network identity list (PLMN-Identity List), and a system information validity time (SI-Validity Time), and parameters in a SIB 2 such as an access control barring factor (ac-Barring Factor), access control barring for emergency (ac-Barring For Emergency), access control barring for mobile originating-data (ac-Barring For Mobile Originating-Data, ac-Barring For MO-Data), access control barring for mobile originating-signaling (ac-Barring For MO-Signaling), access control barring for special access class (ac-Barring For Special AC), and an access control barring time (ac-Barring Time).

Optionally, in some embodiments, the broadcast message may be carried in a discovery message or an LTE D2D sidelink master information block message (Master Information Block-SL message).

Optionally, in some embodiments, the first terminal device may periodically broadcast the public SI or the some parameters in the public SI to the second terminal device.

In 550, the first terminal device sends target system information SI other than the public SI to the second terminal device.

Optionally, in some embodiments, the first terminal device may determine, based on the obtained first indication information, a system information type required by the second terminal device other than the public SI.

Optionally, in some embodiments, when the first terminal device receives a paging message indicating a system information change, the first terminal device sends, to the second terminal device, system information other than a master information block MIB, a system information block SIB 1, a SIB 10, a SIB 11, a SIB 12, a SIB 14, and the public SI in the target SI.

Optionally, in some embodiments, when the first terminal device receives a paging message indicating an EAB parameter change, the first terminal device sends a SIB 14 to the second terminal device supporting the EAB capability.

Optionally, in some embodiments, when the first terminal device receives a paging message indicating that there is an ETWS primary notification, the first terminal device sends a SIB 10 to the second terminal device supporting the ETWS capability.

Optionally, in some embodiments, when the first terminal device receives a paging message indicating that there is an ETWS secondary notification, the first terminal device sends a SIB 11 to the second terminal device supporting the ETWS capability.

Optionally, in some embodiments, when the first terminal device receives a paging message indicating that there is a CMAS notification, the first terminal device sends a SIB 12 to the second terminal device supporting the CMAS capability.

Optionally, in some embodiments, after a communication connection relationship, a pairing relationship, an association relationship, or a connection relationship is established between the first terminal device and the second terminal device, the first terminal device sends, to the second terminal device, all SI required by the second terminal device other than the public system information. Optionally, in some embodiments, when the first terminal device performs cell reselection, intra-frequency handover, inter-frequency handover, and inter-RAT handover, the first terminal device sends the target SI to the second terminal device, and the target SI is all SI required by the second terminal device other than the public SI.

The SIB 1 or some parameters in the SIB 1 are the public SI. Therefore, when the first terminal device detects that the SIB 1 changes, the first terminal device may send an updated SIB 1 or some parameters in an updated SIB 1 to all second terminal devices in a broadcast manner.

Optionally, in some embodiments, the broadcast message sent by the first terminal device to the second terminal device may be alternatively a discovery message or a master information block-SL message, and the discovery message or the master information block-SL message carries the target SI. The target SI in this case is the SI required by the second terminal device or at least some of the SI required by the second terminal device.

The discovery message or the master information block-SL message is information periodically broadcast by the first terminal device. Therefore, when sending the target SI to the second terminal device, the first terminal device may add the target SI into the discovery message or the master information block-SL message, and broadcast the target SI when the first terminal device broadcasts the discovery message or the master information block-SL message to the second terminal device.

Optionally, in some embodiments, the first terminal device may be a relay terminal device, for example, a smartphone; and the second terminal device may be a wearable device, for example, a smartwatch or a smart band. However, this embodiment of the present invention is not limited thereto.

In this embodiment of the present invention, the first terminal device sends the public SI to all second terminal devices in a broadcast manner, and therefore the public SI required by all the second terminal devices can be sent only once in a broadcast manner, thereby reducing signaling interactions between the first terminal device and the second terminal device. This reduces signaling overheads, avoids resource waste, and helps the first terminal device and the second terminal device save power.

Figure 6:
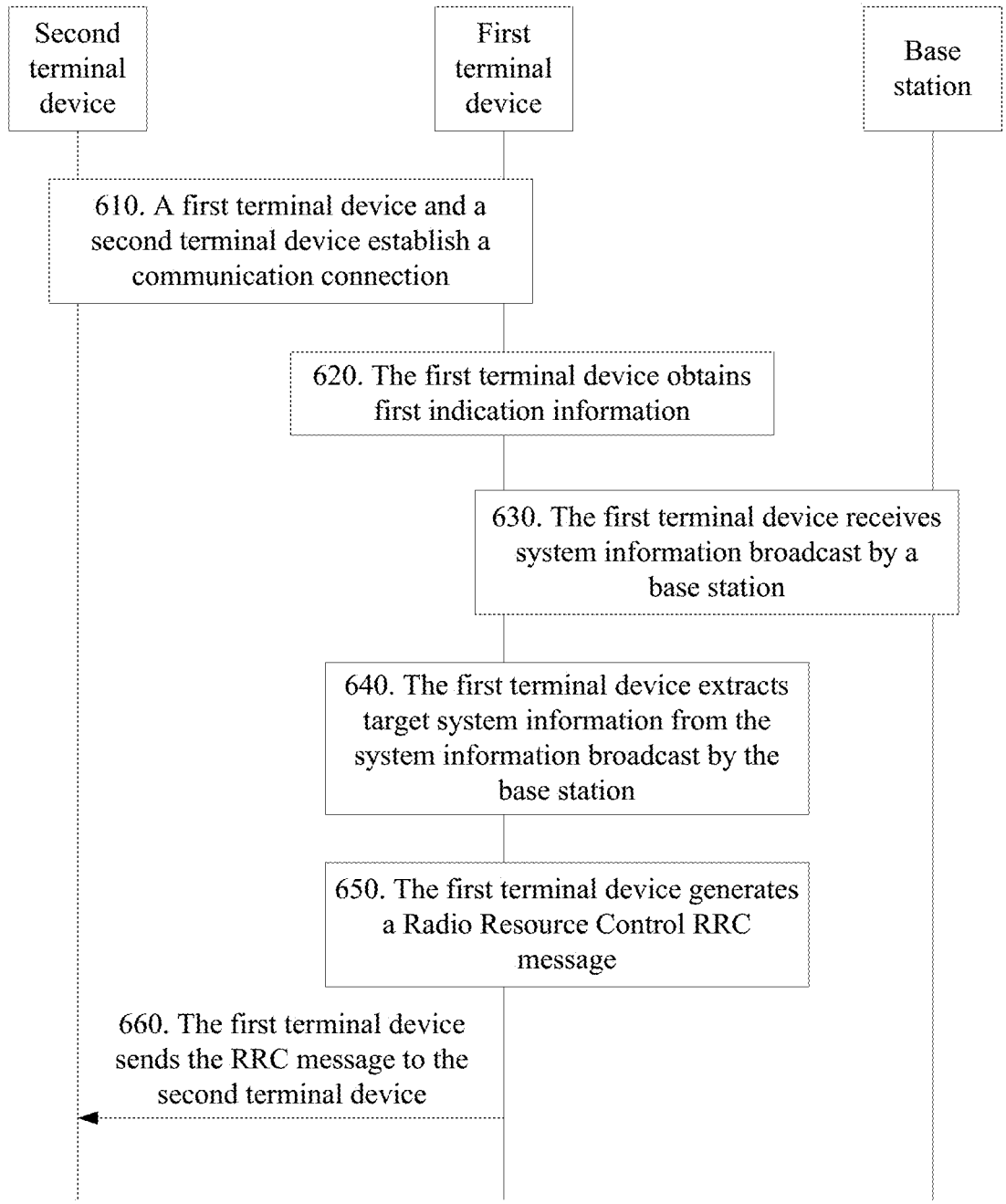
FIG. 6 is still yet another schematic flowchart of a method for transmitting system information according to an embodiment of the present invention.

FIG. 6 is a schematic flowchart of a method 600 for transmitting system information according to an embodiment of the present invention.

In 610, a first terminal device and a second terminal device establish a communication connection.

Optionally, in some embodiments, the communication connection may be a Bluetooth connection, or may be a WLAN connection, or may be a D2D connection.

In 620, the first terminal device obtains first indication information.

Optionally, in some embodiments, the first indication information may be a capability supported by the second terminal device.

For example, the first indication information may be an EAB capability supported by the second terminal device, or may be an ETWS capability supported by the second terminal device, or may be a CMAS capability supported by the second terminal device, or may be an SSAC capability supported by the second terminal device, or may be an ACDC capability supported by the second terminal device.

It should be understood that in this embodiment of the present invention, the capability supported by the second terminal device is described only by using the foregoing five types of capabilities. However, this embodiment of the present invention is not limited thereto.

Optionally, in some embodiments, the first indication information may be alternatively of a system information type required by the second terminal device.

In this embodiment of the present invention, the first terminal device may send system information required by the second terminal device to the second terminal device based on the capability supported by the second terminal device or directly based on the system information type required by the second terminal device, so that the first terminal device does not send system information unnecessary for the second terminal device to the second terminal device. This reduces signaling overheads between the first terminal device and the second terminal device, and avoids resource waste.

Optionally, in some embodiments, that the first terminal device obtains first indication information may be: The first terminal device receives the first indication information sent by the second terminal device.

Optionally, in some embodiments, that the first terminal device obtains first indication information may be alternatively: The first terminal device receives the first indication information sent by a base station or an MME.

In 630, the first terminal device receives system information broadcast by a base station.

Optionally, in some embodiments, when the base station broadcasts the system information to the first terminal device, the broadcast system information is sent to the first terminal device in a form of an RRC message. A MIB and a SIB 1 may be broadcast to the first terminal device in a form of two separate RRC messages. Other SIBs are broadcast to the first terminal device by using a plurality of RRC messages, and one RRC message may carry a plurality of other SIBs.

In 640, the first terminal device extracts target SI from the system information broadcast by the base station.

Optionally, in some embodiments, the first terminal device may extract, based on the obtained first indication information, the target SI from the system information broadcast by the base station.

In 650, the first terminal device generates an RRC message.

Optionally, in some embodiments, the first terminal device may reconstruct the target SI or some parameters in the target SI into the RRC message.

For example, when the second terminal device has only a basic capability, the system information or parameters in the system information that the second terminal device needs to receive may be a parameter in the SIB 1 such as a cell identity, a cell barred state, a cell reserved for operator use state, a closed subscriber group identity, a closed subscriber group indication, a tracking area code, a system information value tag, a category o allowed indication, a public land mobile network identity list, or a system information validity time, and a parameter in a SIB 2 related to access control such as an access control barring factor, access control barring for emergency, access control barring for mobile originating-data, access control barring for mobile originating-signaling, access control barring for special access class, or an access control barring time. The first terminal device may generate an RRC message including the foregoing parameter, so that the first terminal device does not need to send another parameter not required by the second terminal device in the SIB 1 and the SIB 2 to the second terminal device. This reduces signaling interactions between the first terminal device and the second terminal device, avoids resource waste, and helps the first terminal device and the second terminal device save power.

For another example, the second terminal device supporting the SSAC capability not only needs the foregoing parameters in the SIB 1 and the SIB 2, but also needs an SSAC-related parameter in the SIB 2, for example, service specific access control baring for multimedia telephony video (ssac-Barring For MMTEL-video) or service specific access control barring for multimedia telephony voice (ssac-Barring For MMTEL-voice). In this case, the first terminal device may reconstruct one or more SIBs and/or a parameter in one or more SIBs in SI required by the second terminal device supporting the SSAC capability, into one RRC message.

For still another example, the second terminal device supporting the ACDC capability further needs an ACDC-related parameter in the SIB 2, for example, an ACDC application specific congestion control for data communication barring configuration (acdc-Barring Config), an ACDC application specific congestion control for data communication category (acdc-Category), an ACDC only for home public land mobile network (acdc-Only For HPLMN) indication, or a barring per ACDC-category list (barring Per ACDC-Category List). In this case, the first terminal device may reconstruct one or more SIBs and/or a parameter in one or more SIBs in SI required by the second terminal device supporting the ACDC capability, into one RRC message.

For yet another example, the second terminal device supporting a multimedia broadcast multicast service (MBMS) capability not only needs the foregoing parameters in the SIB 1 and the SIB 2, but also needs a SIB 13 and a SIB 15. In this case, the first terminal device may reconstruct one or more SIBs and/or a parameter in one or more SIBs in SI required by the second terminal device supporting the MBMS capability, into one RRC message.

In 660, the first terminal device sends the RRC message to the second terminal device.

After the first terminal device extracts, based on the first indication information, the target SI from the system information required by the second terminal device and generates the RRC message, the first terminal device sends the RRC message to the second terminal device, and the RRC message carries all or some system information required by the second terminal device, namely, the target SI.

Optionally, in some embodiments, the first terminal device may be a relay terminal device, for example, a smartphone; and the second terminal device may be a wearable device, for example, a smartwatch or a smart band. However, this embodiment of the present invention is not limited thereto.

In this embodiment of the present invention, when generating the RRC message, the first terminal device may extract only some parameters in a SIB and generate the RRC message, and the some parameters are parameters required by the second terminal device at a current moment, and therefore the first terminal device can neither send system information not required by the second terminal device to the second terminal device, nor send some parameters not required by the second terminal device in the system information to the second terminal device, and the first terminal device can further reconstruct a plurality of pieces of system information required by the second terminal device into one RRC message. This better helps reduce signaling interactions between the first terminal device and the second terminal device, reduce signaling overheads, and avoid resource waste, and helps the first terminal device and the second terminal device save power.

The foregoing describes the method embodiments of the embodiments of the present invention in detail with reference to FIG. 2 to FIG. 6. The following describes terminal device embodiments of the embodiments of the present invention in detail with reference to FIG. 7 to FIG. 9. It should be understood that the terminal device embodiments and the method embodiments correspond to each other, and for similar descriptions, reference may be made to the method embodiments.

Figure 7:
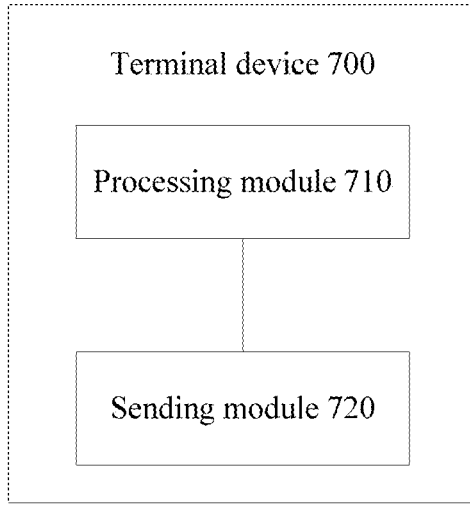
FIG. 7 is a schematic block diagram of a terminal device according to an embodiment of the present invention.

FIG. 7 is a schematic block diagram of a terminal device 700 according to an embodiment of the present invention. As shown in FIG. 7, the terminal device 700 includes a processing module 710, configured to obtain first indication information. The processing module 710 is further configured for the terminal device to determine, based on the first indication information, system information SI required by a second terminal device, where the second terminal device communicates with a base station via the terminal device. A sending module 720 is configured to send a message including target SI to the second terminal device, where the target SI is at least some or all of the SI required by the second terminal device.

In this embodiment of the present invention, the terminal device 700 can determine, based on the first indication information of the second terminal device obtained by the processing module 710, the system information SI required by the second terminal device, so that the terminal device 700 sends the system information required by the second terminal device to the second terminal device by using the sending module 720. This reduces signaling interactions between the first terminal device and the second terminal device, reduces signaling overheads, and avoids resource waste.

Optionally, in some embodiments, the first indication information is used to indicate a capability supported by the second terminal device.

Optionally, in some embodiments, the first indication information is used to indicate SI required by the second terminal device.

The processing module 710 is further configured to determine, based on the capability supported by the second terminal device, the SI required by the second terminal device.

The processing module 710 is further configured to add the second terminal device into a target terminal device group, where all terminal devices in the target terminal device group require the target SI.

The sending module 720 is specifically configured to send a multicast message to the terminal devices in the target terminal device group, where the multicast message includes the target SI.

Optionally, in some embodiments, the sending module 720 is further configured to send a first broadcast message to the second terminal device, where the first broadcast message includes public SI.

Optionally, in some embodiments, the sending module 720 is further configured to send a second broadcast message to the second terminal device, where the second broadcast message is a discovery message or a master information block-SL message, and the discovery message or the master information block-SL message carries the target SI. The target SI in this case is the SI required by the second terminal device or at least some of the SI required by the second terminal device.

It should be understood that the public SI is SI required by all second terminal devices or some parameters in SI required by all second terminal devices.

Optionally, the terminal device 700 further includes a receiving module 730, configured to receive system information broadcast by the base station.

Optionally, in some embodiments, the processing module 710 is further configured to extract the target SI from the system information broadcast by the base station and generate a Radio Resource Control RRC message, where the RRC message includes the target SI.

Optionally, in some embodiments, the sending module 720 is further configured to send the RRC message to the second terminal device.

Optionally, in some embodiments, the processing module 710 is specifically configured to receive the first indication information sent by the second terminal device.

Optionally, in some embodiments, the processing module 710 is further configured to receive the first indication information sent by the base station or a mobility management entity MME.

Optionally, in some embodiments, the sending module 720 is further configured to: when the terminal device receives a paging message indicating a system information change, send, to the second terminal device, system information other than a master information block MIB, a system information block SIB 1, a SIB 10, a SIB 11, a SIB 12, and a SIB 14 in the target SI.

Optionally, in some embodiments, the sending module 720 is further configured to: when the terminal device 700 receives a paging message indicating an EAB parameter change, send an updated SIB 14 to the second terminal device.

Optionally, in some embodiments, the sending module 720 is further configured to: when the terminal device 700 receives a paging message indicating that there is an ETWS primary notification, send a SIB 10 to the second terminal device.

Optionally, in some embodiments, the sending module 720 is further configured to: when the terminal device 700 receives a paging message indicating that there is an ETWS secondary notification, send a SIB 11 to the second terminal device.

Optionally, in some embodiments, the sending module 720 is further configured to: when the terminal device 700 receives a paging message indicating that there is a CMAS notification, send a SIB 12 to the second terminal device.

Optionally, in some embodiments, the sending module 720 is further configured to: after a communication connection relationship, a pairing relationship, or an association relationship is established between the terminal device 700 and the second terminal device, send the target SI to the second terminal device.

Optionally, in some embodiments, the sending module 720 is further configured to: when the terminal device 700 performs or completes cell reselection and handover, send the target SI to the second terminal device.

Optionally, in some embodiments, the sending module 720 is further configured to: when the terminal device 700 detects that a SIB 1 changes, send, to the second terminal device, an updated SIB 1 or a parameter required by the second terminal device in an updated SIB 1.

Optionally, in some embodiments, the sending module 720 is further configured to: when the terminal device 700 detects that a parameter required by the second terminal device in a SIB 1 changes, send, to the second terminal device, an updated SIB 1 or a parameter required by the second terminal device in an updated SIB 1.

It should be understood that the terminal device 700 according to this embodiment of the present invention may be corresponding to the first terminal device in the embodiments of the present invention. In addition, both the foregoing and other operations and/or functions of the modules in the terminal device 700 are to implement corresponding procedures of the methods in FIG. 2 to FIG. 6. For brevity, details are not repeated herein.

Figure 8:
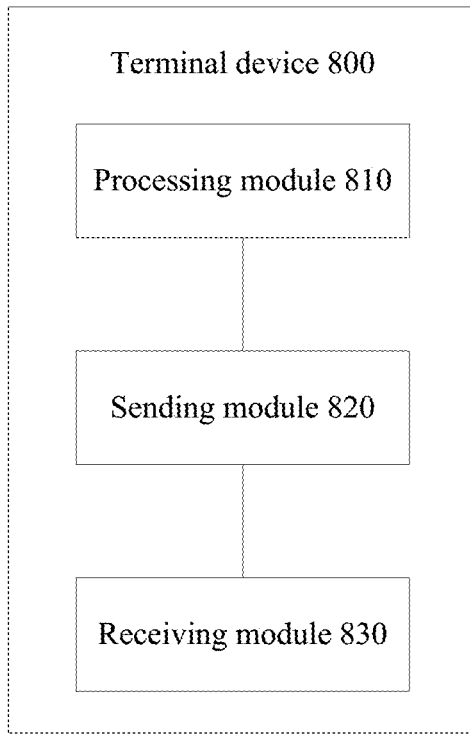
FIG. 8 is another schematic block diagram of a terminal device according to an embodiment of the present invention.

FIG. 8 is a schematic structural diagram of a terminal device 800 according to an embodiment of the present invention. As shown in FIG. 8, the terminal device 800 includes a processing module 810, configured to generate first indication information. The first indication information indicates system information SI required by the terminal device 800. A sending module 820 is configured to send the first indication information to a first terminal device. The terminal device communicates with a base station via the first terminal device. A receiving module 830 is configured to receive a message that includes target SI and that is sent by the first terminal device. The target SI is at least some or all of the SI required by the terminal device 800.

In this embodiment of the present invention, the terminal device 800 sends the first indication information to the first terminal device by using the sending module 820, so that the first terminal device determines the system information SI required by the terminal device 800, and the target SI received by the terminal device 800 by using the receiving module 830 is the SI required by the terminal device 800 or at least some of the SI required by the terminal device 800. This reduces signaling interactions between the first terminal device and the terminal device 800, reduces signaling overheads, and avoids resource waste.

Optionally, in some embodiments, the first indication information may be used to indicate a capability supported by the terminal device.

Optionally, in some embodiments, the first indication information may be alternatively used to indicate the SI required by the terminal device.

Optionally, in some embodiments, the receiving module 830 is specifically configured to receive a multicast message sent by the first terminal device to a target terminal device group, and all terminal devices in the target terminal device group require the target SI, and the multicast message includes the target SI.

Optionally, in some embodiments, the receiving module 830 is further configured to receive a first broadcast message sent by the first terminal device, where the first broadcast message includes public SI.

Optionally, in some embodiments, the receiving module 830 is further configured to receive a second broadcast message sent by the terminal device 800, where the second broadcast message is a discovery message or a master information block-SL message, and the discovery message or the master information block-SL message carries the target SI. The target SI in this case is the SI required by the terminal device 800 or at least some of the SI required by the terminal device 800.

It should be understood that the public SI is SI required by all terminal devices Boo or some parameters in SI required by all terminal devices 800.

Optionally, in some embodiments, the receiving module 830 is further configured to receive a Radio Resource Control RRC message generated by the first terminal device, where the RRC message includes the target SI.

It should be understood that the terminal device 800 according to this embodiment of the present invention may be corresponding to the terminal device 800 in the embodiments of the present invention. In addition, both the foregoing and other operations and/or functions of the modules in the terminal device 800 are to implement corresponding procedures of the methods in FIG. 2 to FIG. 6. For brevity, details are not repeated herein.

Figure 9:
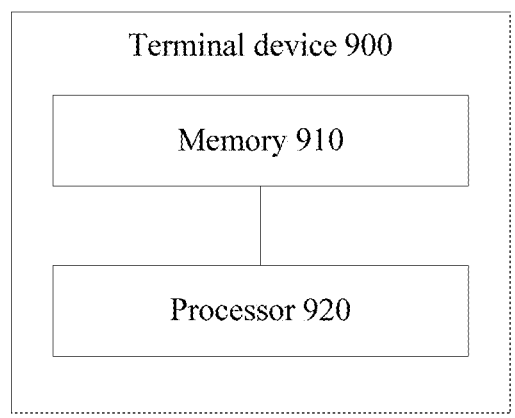
FIG. 9 is still another schematic block diagram of a terminal device according to an embodiment of the present invention.

FIG. 9 is a schematic structural diagram of a terminal device 900 according to an embodiment of the present invention. As shown in FIG. 9, the terminal device 900 includes a memory 910 and a processor 920. The memory 910 and the processor 920 communicate with each other through an internal connection path to transfer control and/or data signals.

The memory 910 is configured to store program code.

The processor 920 is configured to invoke the program code to implement the methods in the foregoing embodiments of the present invention.

In this embodiment of the present invention, the processor 920 may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. An embodiment of the present invention provides a computer readable medium, configured to store computer program code. The computer program includes instructions used to perform the methods for transmitting system information according to the embodiments of the present invention in FIG. 2 to FIG. 6. The readable medium may be a read-only memory (ROM) or a random access memory (RAM). This is not limited in this embodiment of the present invention.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, units and algorithm steps in the examples described in the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, wherein the method comprises:
receiving, by a first terminal device from a second terminal device, first indication information, wherein the first indication information comprises information indicating one or more capabilities supported by the second terminal device, the one or more capabilities including an extended access barring (EAB) capability, a commercial mobile alert service (CMAS) capability, a service specific access control (SSAC) capability, or an application specific congestion control for data communication (ACDC) capability supported by the second terminal device;
determining, by the first terminal device, all of system information (SI) required by the second terminal device based on the first indication information including the one or more capabilities supported by the second terminal device, wherein the second terminal device communicates with a base station via the first terminal device; and
sending, by the first terminal device, a message comprising target SI to the second terminal device, wherein the target SI is some or all of the SI required by the second terminal device.

2. The method according to claim 1, wherein the first indication information comprises information indicating a type of the SI required by the second terminal device.

3. The method according to claim 1, wherein the method further comprises:
sending, by the first terminal device, a first broadcast message to the second terminal device, wherein the first broadcast message comprises public SI and the target SI does not comprise the public SI.

4. The method according to claim 1, wherein the sending the message comprising the target SI comprises:
sending, by the first terminal device, a second broadcast message, wherein the second broadcast message is a discovery message that carries the target SI or a master information block-SL message that carries the target SI.

5. The method according to claim 1, wherein the sending the message comprising the target SI comprises:
receiving, by the first terminal device, system information broadcast by the base station;
extracting, by the first terminal device, the target SI from the system information broadcast by the base station;
generating, by the first terminal device, a Radio Resource Control (RRC) message, wherein the RRC message comprises the target SI; and
sending, by the first terminal device, the RRC message to the second terminal device.

6. A method, wherein the method comprises:
generating, by a second terminal device, first indication information that indicates system information (SI) required by the second terminal device, wherein the first indication information comprises information indicating one or more capabilities supported by the second terminal device, the one or more capabilities including an extended access barring (EAB) capability, a commercial mobile alert service (CMAS) capability, a service specific access control (SSAC) capability, or an application specific congestion control for data communication (ACDC) capability supported by the second terminal device;
sending, by the second terminal device, the first indication information to a first terminal device for the first terminal device to determine all of the SI required by the second terminal device, wherein the second terminal device communicates with a base station via the first terminal device; and
receiving, by the second terminal device from the first terminal device, a message that comprises target SI, wherein the target SI is some or all of the SI required by the second terminal device.

7. The method according to claim 6, wherein the first indication information comprises information indicating a type of the SI required by the second terminal device.

8. The method according to claim 6, wherein the method further comprises:
receiving, by the second terminal device, a first broadcast message sent by the first terminal device, wherein the first broadcast message comprises public SI and the target SI does not comprise the public SI.

9. The method according to claim 6, wherein the receiving the message that comprises the target SI comprises:
receiving, by the second terminal device, a second broadcast message sent by the first terminal device, wherein the second broadcast message is a discovery message that carries the target SI or a master information block-SL message that carries the target SI.

10. The method according to claim 6, wherein the receiving the message that comprises the target SI comprises:
receiving, by the second terminal device, a Radio Resource Control (RRC) message generated by the first terminal device, wherein the RRC message comprises the target SI.

11. A terminal device comprising:
a transceiver;
a non-transitory memory storage comprising instructions; and
a processor in communication with the non-transitory memory storage, wherein the processor is configured to execute the instructions to:
receive first indication information from a second terminal device, wherein the first indication information comprises information indicating one or more capabilities supported by the second terminal device, one or more capabilities including an extended access barring (EAB) capability, a commercial mobile alert service (CMAS) capability, a service specific access control (SSAC) capability, or an application specific congestion control for data communication (ACDC) capability supported by the second terminal device;
determine all of system information (SI) required by second terminal device based on the first indication information including the one or more capabilities supported by the second terminal device, wherein the second terminal device communicates with a base station via the terminal device; and
send a message comprising target SI to the second terminal device, wherein the target SI is at least some or all of the SI required by the second terminal device.

12. The terminal device according to claim 11, wherein the first indication information comprises information indicating a type of the SI required by the second terminal device.

13. The terminal device according to claim 11, wherein the processor is further configured to execute the instructions to:

send a first broadcast message that comprises public SI and wherein the target SI does not comprise the public SI.

14. The terminal device according to claim 11, wherein the processor is further configured to execute the instructions to:
send a second broadcast message to the second terminal device, wherein the second broadcast message is a discovery message that carries the target SI or a master information block-SL message that carries the target SI.

15. The terminal device according to claim 11, wherein the processor is further configured to execute the instructions to:
receive system information broadcast by the base station;
extract the target SI from the system information broadcast by the base station;
generate a Radio Resource Control (RRC) message that comprises the target SI; and
send the RRC message to the second terminal device.

16. A terminal device, wherein the terminal device comprises:
a transceiver;
a non-transitory memory storage comprising instructions; and
a processor in communication with the non-transitory memory storage, wherein the processor is configured to execute the instructions to:
generate first indication information that indicates system information (SI) required by the terminal device, wherein the first indication information comprises information indicating one or more capabilities supported by the terminal device, the one or more capabilities including an extended access barring (EAB) capability, a commercial mobile alert service (CMAS) capability, a service specific access control (SSAC) capability, or an application specific congestion control for data communication (ACDC) capability supported by the terminal device;
send the first indication information to a first terminal device for the first terminal device to determine all of the SI required by the terminal device, wherein the terminal device is configured to communicate with a base station via the first terminal device; and
receive a message that comprises target SI from the first terminal device, wherein the target SI is some or all of the SI required by the terminal device.

17. The terminal device according to claim 16, wherein the first indication information comprises information indicating a type of the SI required by the terminal device.

18. The terminal device according to claim 16, wherein the processor is further configured to execute the instructions to:
receive a first broadcast message sent by the first terminal device, wherein the first broadcast message comprises public SI and the target SI does not comprise the public SI.

19. The terminal device according to claim 16, wherein the processor is further configured to execute the instructions to:
receive a second broadcast message sent by the first terminal device, wherein the second broadcast message is a discovery message that carries the target SI or a master information block-SL message that carries the target SI.

20. The terminal device according to claim 16, wherein the processor is further configured to:
execute the instructions to receive a Radio Resource Control (RRC) message generated by the first terminal device, and wherein the RRC message comprises the target SI.

21. The method of claim 1, further comprising:
adding, by the first terminal device, the second terminal device into a target device group based on the first indication information, wherein terminal devices in the target device group share at least one requirement for the SI, wherein the message is a multicast message, and wherein the sending comprises:
sending, by the first terminal device, the multicast message including the target SI to the terminal devices in the target device group.

22. The method of claim 1, wherein the one or more capabilities include the SSAC capability or the ACDC capability, wherein the first indication information includes an updated parameter of the one or more capabilities, and wherein the SI in the message comprises an updated SI.

* * * * *